US006765988B1

(12) United States Patent
Rozier et al.

(10) Patent No.: US 6,765,988 B1
(45) Date of Patent: Jul. 20, 2004

(54) AUTOMATED DISPATCHING FROM A TELEPHONE CABLE AIR PRESSURE MONITORING SYSTEM

(75) Inventors: Ronnie L. Rozier, Lithonia, GA (US); Elizabeth Ann Beamon, Kannapolis, NC (US); Philip B. Ashcraft, Cumming, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 99 days.

(21) Appl. No.: 10/261,074

(22) Filed: Sep. 30, 2002

(51) Int. Cl.$^7$ .......................... H04M 1/24; H04M 3/08; H04M 3/22

(52) U.S. Cl. .................. 379/22.03; 379/9.02; 379/9.03; 379/9.04; 379/27.01; 379/29.09; 379/30

(58) Field of Search .............................. 379/1.01, 2, 5, 379/9.02, 9.03, 9.04, 10.01, 10.02, 10.03, 12, 13, 14, 15.01, 15.02, 15.03, 15.04, 15.05, 22.03, 26.01, 26.02, 27.01, 27.08, 29.01, 29.09, 32.01, 30; 370/241, 242, 244, 247, 250, 251

(56) References Cited

U.S. PATENT DOCUMENTS

| 5,521,958 | A | * | 5/1996 | Selig et al. .................... 379/21 |
| 5,790,633 | A | | 8/1998 | Kinser, Jr. et al. ............ 379/10 |
| 5,870,667 | A | | 2/1999 | Globuschutz ............. 455/67.1 |
| 5,953,389 | A | | 9/1999 | Pruett et al. .................... 379/9 |
| 6,353,902 | B1 | | 3/2002 | Kutatunge et al. .......... 714/712 |
| 6,614,882 | B1 | * | 9/2003 | Beamon et al. .......... 379/27.01 |

OTHER PUBLICATIONS

U.S. Ser. No. 09/727,066, filed Nov. 30, 2000, entitled "Pressure Alarms and Reports System Module for Proactive Maintenance Application", Inventors: Beamon et al.
U.S. Ser. No. 09/726,749, filed Nov. 30, 2000, entitled "Proact Module for Proactive Maintenance Application", Inventors: Beamon.
U.S. Ser. No. 09/844,001, filed Apr. 27, 2001, entitled "Proact Module for Proactive Maintenance Application", Inventors: Beamon et al.

* cited by examiner

Primary Examiner—Binh Tieu
(74) Attorney, Agent, or Firm—Merchant & Gould LLC

(57) ABSTRACT

A method and system are provided for automating the dispatching of maintenance services from a telephone cable air pressure monitoring system. If air pressure maintained in a telephone cable conduit drops below a required level, an alarm may be generated at an air pressure alarm and report system (APARS). If the APARS determines that an unacceptable air pressure exists, data associated with the cable conduit is sent to a proactive maintenance application (PMA). The PMA checks other data associated with the conduit in question to determine if an acceptable condition exists that is responsible for the drop in air pressure or air flow. If the PMA does not determine that the change in air pressure or air flow is acceptable, the PMA generates a work order or work ticket for ordering a repair of the conduit. The work order is transmitted to a dispatch system. At the dispatch system, an operator verifies the status of the conduit in question. If the status is verified as unacceptable, the dispatch operator directs a repair technician to the conduit in question for repairs.

15 Claims, 2 Drawing Sheets

AUTOMATED DISPATCHING FROM A TELEPHONE CABLE AIR PRESSURE MONITORING SYSTEM

FIELD OF THE INVENTION

This invention relates to a method and system for automated dispatching of maintenance services for a telephone cable air pressure monitoring system.

BACKGROUND OF THE INVENTION

Residential and business telephone customers are connected to telephone systems by copper cables, copper wires, and fiber optic cables. The copper cables and wires, for example, are the familiar one or more telephone lines running throughout nearly every home and business in the United States. Fiber optic cables are increasingly used to carry massive amounts of voice and data transmissions between transmission points such as large metropolitan areas, educational institutions, and business centers. Because copper cables, copper wires, and fiber optic cables are connected to nearly all homes, businesses, educational centers, and the like through the public switched telephone network, these cables and wires must be maintained to provide continuous and uninterrupted telephone service.

One problem associated with telephone system cables is that moisture or water contact with the cables may cause unacceptable degradation or even loss of the signal transmission capacity of the cables. This problem is especially serious with the advent of underground disposition of telephone system cabling. It is not uncommon for hundreds or thousands of telephone system cables to be placed in a city utility system or underground conduit system which routinely become soaked by or even submerged in water. For example, in a typical city utility system accessible by manholes, telephone system cables may be submerged under several feet of flowing water flowing to or from the city's water or sewer system. If the telephone system cables become wet by their contact with the water, a degradation or loss of signal transmission capacity may be experienced.

In order to avoid this problem, telephone system cables are housed in a pressured conduit that protects the cables from contact with water or moisture. A determination is made as to the amount of air pressure and air flow that must be maintained in the conduit for preventing the entry of water or moisture based on the location of the conduit. For example, if the conduit is placed in a city utility system where it may be submerged under several feet of water, a sufficient amount of air pressure and air flow must be maintained in the conduit to prevent entry of water or moisture into the conduit as a function of the pressure exerted on the conduit by the depth of water in which the conduit is submerged. Likewise, if the conduit is buried in soil, a determination is made as to the appropriate air pressure and air flow required for repelling water and moisture under that condition.

To ensure that an appropriate level of air pressure and air flow is maintained in such as a conduit, an air pressure alarm and reporting system is used for monitoring the air pressure and air flow in a given cable conduit and for reporting unacceptable levels of air pressure and air flow in a given conduit to repair personnel. Unfortunately, often the air pressure and air flow in a given conduit has dropped below an acceptable level only temporarily or because some type of acceptable condition exists such as ongoing maintenance of the cable conduit. That is, if maintenance personnel have opened a cable conduit to perform maintenance on cabling contained therein, an associated air pressure drop or air flow drop is an acceptable condition during that maintenance procedure. Likewise, a compressor for providing air pressure may have temporarily shut down due to a power interruption.

Under prior art systems, once the change in air pressure or air flow is detected by the air pressure alarm and reporting system, an alarm is transmitted to repair personnel, and a repair dispatcher dispatches repair personnel to the site of the air pressure or air flow problem only to find that no problem exists because the air pressure or air flow has returned to acceptable levels or because some acceptable condition exists such as ongoing maintenance. Accordingly, there is a need in the art for a method and system of automating the dispatching of maintenance services from a telephone cable air pressure monitoring system so that the dispatching of maintenance services for false alarms associated with changes in air pressure or air flow is minimized.

SUMMARY OF THE INVENTION

Embodiments of the present invention provide a method and system for automating the dispatching of maintenance services from a telephone cable air pressure monitoring system. An air pressure transducer and an air flow transducer are adapted for detecting the air pressure and an air flow through a conduit housing a plurality of cables. A monitoring unit receives data from the transducers and compares air pressure and air flow data against required air pressure and air flow data. On a periodic basis an air pressure alarm and reporting system polls the monitoring unit for data on all pressurized conduits monitored by the monitoring unit. A determination is made at the air pressure alarm and reporting system whether the air pressure or air flow in or through a given conduit has dropped below acceptable levels. If the air pressure and/or air flow has dropped below acceptable levels, the air pressure alarm and reporting system transmits a report of the pressure or flow changes to a proactive maintenance application.

The proactive maintenance application checks other data associated with the conduit in question to determine if an acceptable condition exists that is responsible for the drop in air pressure or air flow, for example, an ongoing maintenance operation that results in a temporary drop in pressure or flow. If the proactive maintenance application does not determine that the change in air pressure or air flow is acceptable, the proactive maintenance application generates a work order or work ticket for ordering a repair of the conduit. The work order is transmitted to a dispatch system. At the dispatch system, an operator verifies the status of the conduit in question. If the status is verified as unacceptable, the dispatch operator directs a repair technician to the conduit in question for repairs.

These and other features, advantages, and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

The following description of embodiments of the present invention is made with reference to the above-described drawings wherein like numerals refer to like parts or components throughout the several figures. The present invention is directed to a method and system for automating the dispatching of maintenance services associated with a telephone cable air pressure monitoring system.

Figure 1:
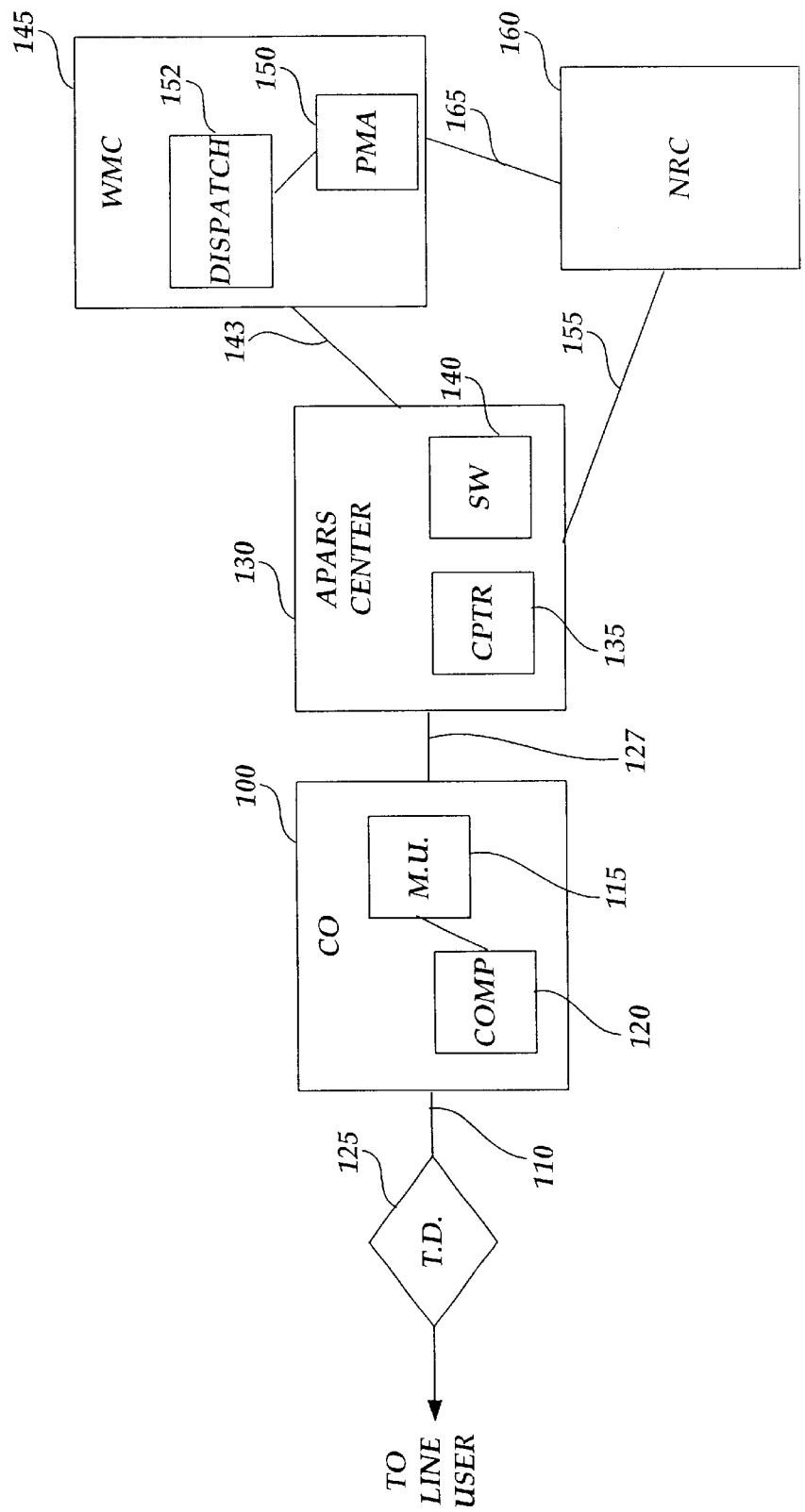
FIG. 1 is a block diagram illustrating components of a telecommunications system and illustrating a telephone system central office and illustrating an air pressure alarm system, work management center, and network reliability center for maintaining telephone system cables within the telephone system.

FIG. 1 is a block diagram illustrating components of a telecommunications system and illustrating a telephone system central office, an air pressure alarm system, a work management center, and a network liability center for maintaining telephone system cables within the telephone system. The central office 100 is representative of a typical telephone system central office utilized in a public switched telephone network (PSTN). According to embodiments of the present invention, the central office 100 includes switching equipment for connecting subscribers to each other via subscriber lines such as the line 110. Other components that may be included in the central office 100 include switching exchanges, switches, cable distribution frames, batteries, and air conditioning and heating systems for maintaining the environment of the central office.

The subscriber line 110 is representative of a subscriber line through which voice and data transmissions may be sent and received to end users at homes, businesses, educational institutions, and the like. According to an embodiment of the present invention, the subscriber line 110 is a cable conduit line in which a plurality of individual subscriber lines is contained. That is, the line 110 includes a conduit in which tens, hundreds, or even thousands of individual cables including copper wire and fiber optic cables may be housed. In a typical setting, the conduit line 110, including cables contained therein, is run between a central office 100 and other switching centers such as other central offices or switching centers, at large metropolitan areas, businesses, large neighborhoods, etc.

Referring still to the central office 100, a monitoring unit 115 is provided for monitoring the status of individual cables, bundles of cables, or conduit lines in which cables or bundles of cables are housed. The monitoring unit 115 is a general purpose computing system including a processor, memory capacity, and software or hardwired instructions for monitoring the status of a given cable, bundle of cables, or cable conduit. According to an embodiment of the present invention, a compressor/dehydrator 120 is provided in the central office 100 for providing pressured air for the conduit line 110 and for dehydrating the air contained within the conduit line to remove unwanted moisture from the conduit line 110. The monitoring unit 115 may monitor the status of the compressor/dehydrator 120 in addition to the monitoring the status of individual cables, bundles of cable, or cable conduits. If the compressor/dehydrator 120 malfunctions or otherwise becomes inoperable, the monitoring unit 115 may detect the malfunction or inoperability and report the malfunction to management and maintenance personnel. As should be understood, the monitoring unit 115 may receive air pressure and air flow data from a number of different telephone cables or cable conduit lines 110 that are associated with the central office 110. Likewise, each central office 110 may have a monitoring unit 115 for monitoring the status of lines 110 for each of those central offices.

A transducer 125 is illustrated in FIG. 1 for detecting air pressure and air flow within the conduit line 110. As should be understood by those skilled in the art, the transducer 125 may be applied to individual cables within a cable conduit 110, or the transducer 125 may be applied to the conduit line 110 in which a plurality of cables is housed. According to an embodiment of the present invention, the transducer 125 may include a separate transducer for detecting air pressure within the conduit line 110 and a separate transducer for detecting air flow within the conduit line 110. During operation, the transducer 125 monitors the air pressure and air flow within the conduit line 110 and signals data associated with the air pressure and air flow within the conduit line 110 back to the monitoring unit 115 at the central office 100. For further description of the operation of the transducer 125 for monitoring and analyzing the air flow and air pressure in the conduit line 110, see U.S. patent application Ser. No. 09/726,749, filed Nov. 30, 2002, entitled "Pressure Alarms and Reports System Module for Proactive Maintenance Application," which is fully incorporated herein by reference.

Referring still to FIG. 1, an air pressure alarm and reporting system center system 130 is provided for receiving air pressure and air flow data from the monitoring unit 115 associated with a plurality of cables or cable conduit lines 110. The air pressure alarm and reporting system center (APARS) 130 includes a computer 135 and software 140 for receiving and analyzing air pressure and air flow data transmitted to the APARS center from the monitoring unit 115. According to an embodiment of the present invention the APARS center computer 135 polls the monitoring unit 115 on a regular basis via a data link 127 to obtain air pressure and air flow data from the monitoring unit 115 for all the individual transducers 125 associated with telephone cables or cable conduit lines 110 with which the transducers 125 are associated.

Once the APARS center receives air pressure and air flow data for a given telephone cable or telephone cable conduit, the software 140 is utilized to analyze that data against historical data for the cable or cable conduit in question and against required air pressure and air flow data for the cable or cable conduit line in question to determine whether the current air pressure and air flow is within acceptable operating parameters. For example, if the required air pressure in a given cable or cable conduit line is 5.0 pounds per square inch (PSI), but the data received from the transducer 125 associated with that cable shows that the current air pressure is only 4.0 PSI, the APARS center computer 135 via the software 140 determines whether the drop in air pressure from the required level of 5.0 PSI to the current level of 4.0 PSI is a condition requiring an alarm and report to be generated to management and maintenance personnel.

In order to analyze the data, the APARS center computer 135 performs a lookup in a threshold table to first determine if the current air pressure falls below acceptable air pressure thresholds for the telephone cable or cable conduit in question. If the current air pressure does fall below an acceptable air pressure range for the cable or cable conduit in question, the APARS center computer 135 may then look at historical data associated with the cable or cable conduit in question. For example, each time a pressure drop associated with a given cable or cable conduit is received, a count associated with that cable is incremented. If historical data associated with this cable indicates that a pressure drop from 5.0 PSI to 4.0 PSI has been encountered on a regular basis over the course of some period of time, for example, a year, but that pressure drop did not indicate a malfunction requiring maintenance, then the APARS center computer 135 may not generate an alarm or report in connection with the current pressure drop.

As should be understood, this logic may be set to be more or less sensitive for telephone cables or cable line conduits depending on their location conditions. For example, if a cable or cable line conduit 110 is located in a city utility system submerged under several feet of water, the APARS center computer 135 may be provided with logic to generate an alarm or report associated with a pressure drop for that cable any time the pressure drops below a certain threshold value, whereas less sensitivity may be applied to a cable or cable line conduit that is located in an area less susceptible to water pressure. Likewise, the APARS center computer 135 and software 140 may be utilized to compare the value associated with the air pressure of a given line with the air flow of a given line such that a drop in air pressure may not require an alarm or report where sufficient air flow exists, or vice versa. For further description of the air pressure alarm and report system, see U.S. patent application Ser. No. 09/726,749, filed Nov. 30, 2000, entitled "Pressure Alarms and Report System Module for Proactive Maintenance Application," which is fully incorporated herein by reference.

Referring still to FIG. 1, a work management center 145 is provided for directing maintenance activities for the telephone network including maintenance activities required in association with air pressure or air flow drops on individual telephone cables or telephone cable conduit lines 110. As should be understood by those skilled in the art, a number of work management centers 145 may be included in a wide spread telecommunications system for managing maintenance and work orders for a given geographical area or region of the overall telecommunications system. A network reliability center 160 is also illustrated in FIG. 1 in association with the work management center 145 and the APARS center 130. According to embodiments of the present invention, the network reliability center 160 may include personnel and systems for monitoring the operation of a large region of a telecommunications system or an entire telecommunications system and for responding to system alarms and malfunctions and for directing the activities of individual work management centers 145 situated throughout the overall telecommunications system and network.

Referring to the work management center 145, a dispatch system 152 is provided for receiving work orders or work tickets and for dispatching maintenance services to perform routine maintenance and/or repair work as needed. According to an embodiment of the present invention, if an air pressure or air flow drop is detected that ultimately results in a requirement that a maintenance technician must be sent to the location of a malfunction, the dispatch system 152 may assign the task to a given maintenance technician. The dispatch system 152 includes dispatch personnel and monitoring equipment for monitoring the status of various components of a telephone network. For example, data from the transducers 125 and monitoring units 115 may be retrieved by dispatch personnel at the dispatch system 152 in order to review and/or verify the status of a given transducer 125 or telephone cable to which it is attached. As should be understood by those skilled in the art, the dispatch system 152 may receive data from various components of the telephone network via a company intranet or via a wide area distributed network such as the Internet.

Referring still to the work management center 145, a proactive maintenance application (PMA) is included for receiving and analyzing alarms and reports received from the air pressure alarms and reports system to determine whether a work order or work ticket should be generated to require the dispatching of maintenance services to attend to an air pressure or air flow drop on a given telephone cable or telephone cable conduit 110. Proactive maintenance application 150 preferably resides in a general purpose computing system at the work management center 145. The PMA requests and acquires information from many other computers connected to the PMA via the data link 143. For example, the PMA 150 may request and acquire data from the APARS center computer 135 which in turns requests and acquires data from the monitoring unit 115 from a given transducer 125.

According to an embodiment of the present invention, the PMA maintains data on a variety of different functions and tasks occurring within the components of the telephone network illustrated in FIG. 1. For example, the PMA 150 maintains information on all maintenance activities occurring throughout the network including maintenance activities occurring at the central office 100 and maintenance activities occurring on individual telephone cables or cable conduits 110. For example, if all transducers 125 associated with telephone cables included in a given cable conduit 110 are to be replaced, information concerning the time of replacement, date of replacement, personnel involved, and the amount of time required for the transducer replacements is stored in memory and is accessible by the PMA 150. For further description of the operation of the PMA 150, see U.S. patent application Ser. No. 09/726,749, filed Nov. 30, 2000, entitled "Pressure Alarms and Report System Module for Proactive Maintenance Application," which is fully incorporated herein by reference. When the APARS center computer 135 determines that the air pressure or air flow associated with a given telephone cable or cable conduit line 110 has dropped to a point to require an alarm and report to be transmitted to management or maintenance personnel, the APARS center computer transmits data associated with the air pressure drop or air flow drop to the PMA 150. The PMA 150 receives the data from the APARS center computer 135 and performs a database lookup on the telephone cable or cable conduit or individual transducer 125 associated with the air pressure or air flow drop. The PMA 150 determines whether any conditions exist that may explain the air pressure or air flow drop. For example, the PMA 150 performs a database lookup on all work logs associated with the telephone cable or cable conduit associated with the alarm received from the APARS center computer 135.

If the PMA 150 locates data indicating that a maintenance operation is in progress for the telephone cable or cable line conduit 110, the PMA 150 may reset the alarm associated with the cable or cable conduit so that no work order or work ticket is generated to repair the cable or cable line conduit. That is, if maintenance is ongoing on the cable or cable conduit, the air pressure or air flow drop is determined to be associated with activities being performed by maintenance personnel as opposed to a malfunction in the air pressure system or a break in a telephone cable line or conduit line. Accordingly, no work order is generated by the PMA 150 and the needless dispatching of a repair technician to the cable or cable conduit is avoided.

As should be understood by those skilled in the art, a variety of other information may be maintained by the PMA 150 for determining whether a work order should be generated. For example, the PMA 150 may include historical data showing that alarms are regularly received from a given transducer 125 which are not associated with actual malfunctions and that maintenance of that transducer 125 has been scheduled. Additionally, the PMA 150 may update records associated with the status of the telephone cable, telephone cable conduit line 110, or transducer 125 such as indicating in the records associated with those components that maintenance activities are scheduled for two additional days. Accordingly, if alarms are received during that two day period, for example, the PMA 150 may readily determine that no action is required in response to an alarm from the APARS center computer 135.

If the PMA 150 determines that no activities are ongoing that explain the air pressure or air flow drop, the PMA 150 generates a work order or work ticket to require that a maintenance technician be sent to the area to check the problem and to affect repairs, if necessary. The work order or work ticket generated by the PMA 150 is transmitted to the dispatch system 152 for dispatching a maintenance technician to perform the required maintenance. Prior to actually dispatching a maintenance technician to affect repairs, dispatch personnel at the dispatch system 152 may log on to a telephone system intranet or to a wide area distributed computing environment such as the Internet to obtain data directly from components associated with the present problem. For example, dispatch personnel may request data directly from a given transducer 125 associated with the air pressure drop or air flow drop. By obtaining information directly from the component in question, or from a monitoring unit 115 associated with the component such as the transducer 125, the dispatch personnel can verify that the problem does still exist prior to actually dispatching a maintenance technician to the site. For example, the air pressure drop or air flow drop causing the alarm individual work order may have been caused by a power fluctuation and the problem may have cleared. Accordingly, if the problem no longer exists, the dispatch personnel may ignore the work order and avoid needlessly sending a maintenance technician to the site of the problem.

OPERATION

Figure 2:
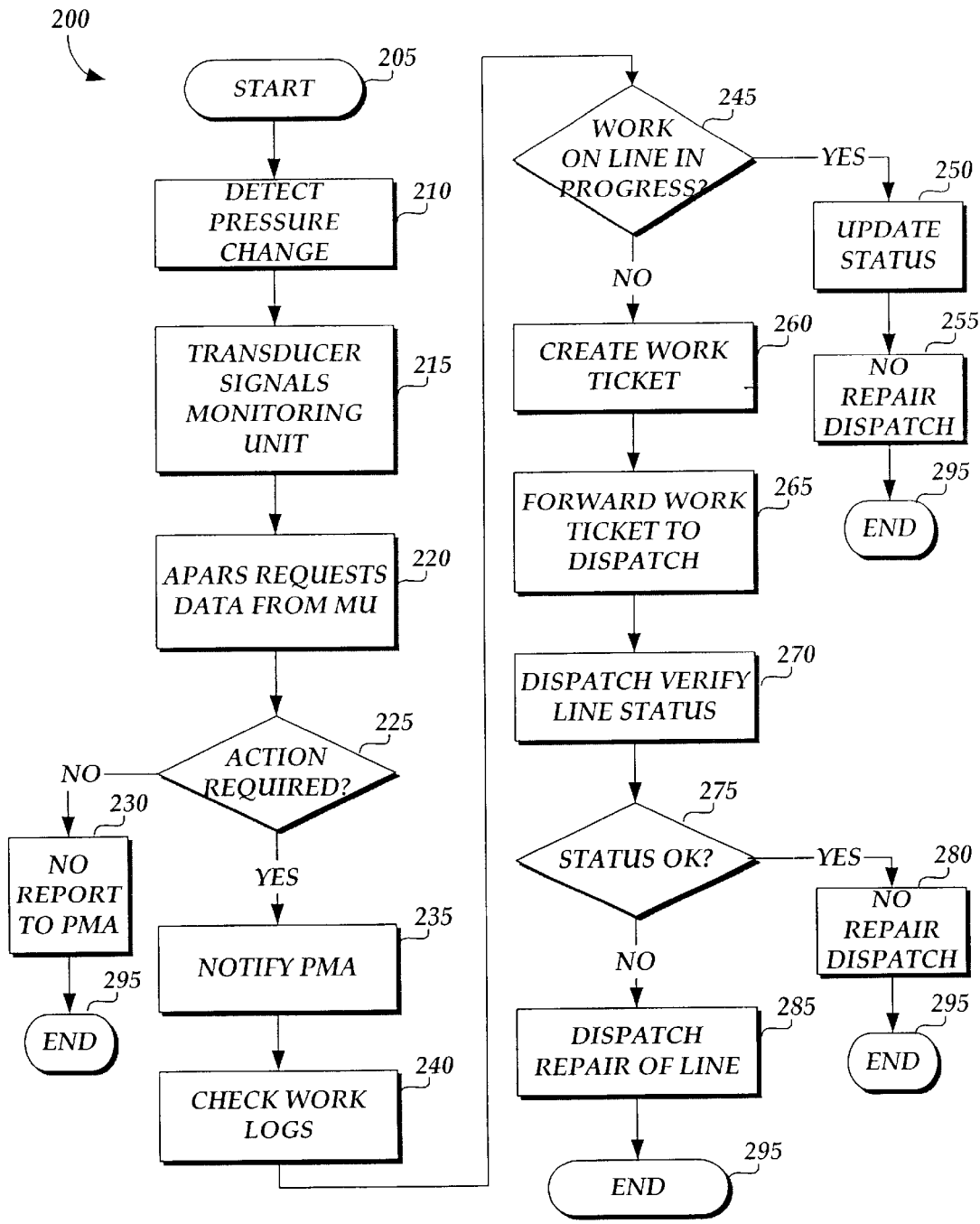
FIG. 2 is a flowchart illustrating a method for automating the dispatching of maintenance services associated with a telephone cable air pressure monitoring system.

Having described an exemplary operating environment for the present invention, FIG. 2 is a flowchart illustrating a method for automating the dispatching of maintenance services associated with a telephone cable air pressure monitoring system. The method 200 begins at start step 205 and proceeds to detection step 210 where the transducer 125 detects an air pressure change associated with pressurized air flowing through a cable conduit 110 and generated from the compressor/dehydrator unit 120. At signaling step 215, the transducer 125 signals the monitoring unit 115 with data associated with an air pressure drop in the conduit line 110. At step 220, the APARS center computer 135 polls the monitoring unit 115 for air pressure and air flow data associated with the transducer 125 and the telephone cable or telephone cable conduit to which it is attached.

At step 225, a determination is made by the APARS center computer 135 as to whether any action is required in response to the air pressure or air flow data received from the monitoring unit 115. As described above, the APARS center computer 135 first determines whether the air pressure or air flow levels are below acceptable thresholds. If not, a further determination is made as to whether the air pressure or air flow levels are acceptable based on other historical data regarding the air pressure and air flow associated with this transducer 125 and the cable or cable conduit to which it is attached. If at step 225, a determination is made that no alarm or report should be sent to the PMA 150, the method proceeds to step 230 and no report is generated. The method then ends at step 295.

If at step 225 a determination is made by the APARS center computer 135 that the air pressure or air flow drop is unacceptable, the methods proceeds to step 235, and the APARS center computer 135 notifies the PMA 150 at the work management center 145. At step 240, the PMA 150 checks other data associated with the cable, cable conduit line, or transducer in question to determine if some other circumstance or condition explains the change in air pressure or air flow. For example, as described above, the PMA 150 searches data associated with work logs to determine whether maintenance or other work tasks are being performed on the transducer 125, cable or cable conduit that explains the air pressure or air flow drop. At step 245, if it is determined by the PMA 150 that some type of work or other activity is in progress that explains the air pressure or air flow drop, the method proceeds to step 250, and the PMA 150 updates the status of the transducer 125, individual cable, or cable conduit accordingly. That is, if work is scheduled to continue for three days on a given transducer, line or line conduit, the PMA 150 may update the work logs to indicate that alarms associated with the transducer, cable or cable conduit may be reset during the period of the work or maintenance. At step 255, the PMA 150 determines that no repair technician should be dispatched, and the method ends at step 295.

Referring back to step 245, if the PMA 150 determines that no condition exists for the transducer 125, the cable, or cable conduit line 110 that explains the air pressure or air flow drop, the method proceeds to step 260, and the PMA 150 creates a work ticket or work order to require maintenance of the transducer 125, cable or cable conduit. At step 265, the PMA 150 forwards the work ticket or work order to the dispatch system 152 for processing. At step 270, dispatch personnel encounter the work order or work ticket generated by the PMA 150, and the dispatch personnel verify the current status of the transducer 125, cable or cable conduit 110. For example, dispatch personnel may log on to a telephone system intranet to obtain data directly from the transducer 125 or monitoring unit 115 to verify the current status of those components. Likewise, the dispatcher may log on to an Internet-based web site established by the telecommunications system for obtaining data on individual components such as the transducer 125 or monitoring unit 115.

At step 275, the dispatcher personnel determines whether the status of the transducer, cable or cable conduit has returned to normal. As should be understood, the air pressure drop or air flow drop may have been associated with a temporary power fluctuation causing a reduction of air pressure from the compressor/dehydrator 120. Under a case such as this, once the power fluctuation cleared, the air pressure and/or air flow may have returned to normal. If the dispatch personnel checks the present reading from the transducer 125 and determines that the air pressure and/or air flow has returned to normal operating parameters, the method proceeds to step 280 and the dispatch personnel may ignore the work ticket or work order and avoid needlessly sending a maintenance technician to the site. The method ends at step 295. If at step 275, the dispatch personnel verifies that the air pressure or air flow condition is still below normal operating parameters, the dispatch personnel may then act on the work order or work ticket received from the PMA 150 and dispatch a repair technician to the site of the problem such as the transducer 125, an individual telephone cable or cable conduit 110.

As described herein, a method and system are provided for automating the dispatching of maintenance or repair services from a telephone cable air pressure monitoring system. As should be understood, the functionality of the present invention is not restricted to monitoring air pressure or air flow of a telephone cable or telephone cable conduit as described above. As should be understood by those skilled in the art, the transducer 125 may be replaced with other monitoring devices for transmitting alarms to a monitoring unit 115. For example, the transducer 125 may be replaced with another type of detection device such as a voltage meter for detecting voltage on a telephone cable line. If the voltage on the telephone cable line changes or drops to an unacceptable level, that information may be transmitted to a monitoring unit 115. Data from the monitoring unit 115 may then be polled from an alarm center 130 to determine whether the voltage on the line has dropped below an acceptable level. As in the case of reporting drops in air pressure or air flow, the condition may be reported to the PMA 150 which may then determine whether maintenance personnel should be dispatched to determine the source of the problem and to correct the problem. Accordingly, the functionality of the present invention may be utilized in any case where data is obtained from components in a network or system and is transmitted to the PMA 150 for determination as to whether an action must be taken on that data prior to sending a human response to the condition associated with the data for affecting a repair or maintenance. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of automating the dispatching of maintenance services associated with a telephone system cable air pressure monitoring system, comprising the steps of:
   detecting a change in an air pressure level associated with a telephone system cable conduit;
   sending data associated with the air pressure level to an air pressure level monitoring unit;
   sending data from the monitoring unit to an air pressure alarm and reporting system;
   at the air pressure alarm and reporting system, determining whether the air pressure level is below an acceptable air pressure level threshold;
   if the air pressure level is not satisfactory, sending a report of the current air pressure level to a proactive maintenance application (PMA);
   at the PMA, determining whether any conditions exist related to the cable conduit that make the current air pressure level acceptable;
   if any conditions exist relating to the cable conduit that make the current air pressure level acceptable, determining that no maintenance services are required to correct the current air pressure level; and
   if maintenance services are required to correct the current air pressure level generating a work order to request a maintenance action to correct the current air pressure level.

2. The method of claim 1, further comprising the steps of:
   sending the work order to a dispatch system;
   at the dispatch system verifying a current status of the air pressure level associated with the cable conduit; and
   if the current status of the air pressure level is not acceptable, dispatching a repair technician to correct the air pressure level.

3. The method of claim 1, whereby the step of determining whether any conditions exist relating to the air pressure level that make the current air pressure level acceptable includes determining whether any maintenance activities are in progress for the cable conduit.

4. The method of claim 1, whereby if the air pressure level is below an acceptable air pressure threshold, determining whether the current air pressure level is satisfactory based on historically acceptable air pressure levels for the cable conduit.

5. A method of automating the dispatching of maintenance services; comprising the steps of:
   detecting a change in a system operating parameter;
   sending data associated with the change in the system operating parameter to a monitoring unit;
   sending the data from the monitoring unit to a system alarm and reporting system;
   at the system alarm and reporting system, determining whether the change in the system operating parameter is outside an acceptable threshold value for the system operating parameter;
   if the change in the system operating parameter is outside an acceptable threshold value, sending a report to a proactive maintenance application (PMA);
   at the PMA, determining whether any conditions exist related to the system that make the change in the system operating parameter acceptable;
   if any conditions exist related to the system that make the change in the system operating parameter acceptable, determining that no maintenance services are required to correct the change in the system operating parameter;
   if maintenance services are required to correct the change in the system operating parameter, generating a work order to request maintenance services to correct the change in the system operating parameter; and
   forwarding the work order to a dispatch system.

6. The method of claim 5, further comprising the steps of:
   at the dispatch system, verifying a current status of the system operating parameter; and
   if the current status of the system operating parameter is not acceptable, dispatching maintenance services to correct the change in the system operating parameter.

7. The method of claim 5, whereby the system operating parameter includes an air pressure level associated with a telephone system cable conduit.

8. The method of claim 5, whereby the system operating parameter includes an air flow level associated with a telephone system cable conduit.

9. The method of claim 7, whereby the step of detecting a change in a system operating parameter includes detecting a pressure change in the air pressure level.

10. The method of claim 8, where the step of detecting a change in a system operating parameter includes detecting a pressure change in the air flow level.

11. The method of claim 6, whereby the step of verifying the status of the system operating parameter includes obtaining data from the system as to the current value of the system operating parameter.

12. A system of automating the dispatching of maintenance services associated with a telephone system cable air pressure monitoring system:
   a transducer operative
      to detect a change in an air pressure level associated with a telephone system cable conduit;

to send data associated with the air pressure level to an air pressure level monitoring unit;

the monitoring unit operative to
to send data to an air pressure alarm and reporting system;

the air pressure alarm and reporting system operative
to determine whether the air pressure level is below an acceptable air pressure level threshold;
to send a report of the current air pressure level to a proactive maintenance application (PMA) if the air pressure level is not satisfactory;

the PMA operative
to determine whether any conditions exist related to the cable conduit that make the current air pressure level acceptable;
to determine that no maintenance services are required to correct the current air pressure level if any conditions exist relating to the cable conduit that make the current air pressure level acceptable; and
to generate a work order to request a maintenance action to correct the current air pressure level if maintenance services are required to correct the current air pressure level.

13. The system of claim 12, whereby:

the PMA is further operative
to send the work order to a dispatch system;

the dispatch system operative
to verify a current status of the air pressure level associated with the cable conduit; and
to dispatch a repair technician to correct the air pressure level if the current status of the air pressure level is not acceptable.

14. The system of claim 12, whereby the PMA is further operative to determine whether any maintenance activities are in progress for the cable conduit as a part of determining whether any conditions exist relating to the air pressure level that make the current air pressure level acceptable.

15. The system of claim 12, whereby the air pressure alarm and reporting system is further operative to determine whether the current air pressure level is satisfactory based on historically acceptable air pressure levels for the cable conduit if the air pressure level is below an acceptable air pressure threshold.

* * * * *